United States Patent [19]

Swearingen

[11] Patent Number: 4,696,585
[45] Date of Patent: Sep. 29, 1987

[54] BEARING SUPPORT SYSTEM WITH CONTROLLABLE SPRING RATE

[76] Inventor: Judson S. Swearingen, 27403 Pacific Coast Hwy., Malibu, Calif. 90264

[21] Appl. No.: 820,534

[22] Filed: Jan. 17, 1986

[51] Int. Cl.[4] ............................................. F16C 17/02
[52] U.S. Cl. .................................... 384/399; 384/118; 384/448
[58] Field of Search ............... 384/399, 448, 118, 111, 384/114, 373

[56] References Cited

U.S. PATENT DOCUMENTS

| | | | |
|---|---|---|---|
| 2,749,190 | 6/1956 | Ball | 348/448 |
| 3,110,527 | 11/1963 | Fox | 384/399 |
| 3,124,395 | 3/1964 | Sternlicht . | |
| 3,290,065 | 12/1966 | Porath | 285/94 |
| 3,350,018 | 10/1967 | Harris et al. | 241/34 |
| 3,588,202 | 6/1971 | Johnson . | |
| 3,804,474 | 4/1974 | Ettles . | |
| 4,215,903 | 8/1980 | Andrews | 384/399 |

*Primary Examiner*—Lenard A. Footland
*Attorney, Agent, or Firm*—Lyon & Lyon

[57] ABSTRACT

A control system for bypassing critical speeds in a high speed rotating turbine shaft supported by multiple journal bearings which includes pairs of apertures disposed in each bearing seat. The pairs of apertures are linked by fluid vent lines having valves disposed therein. The valves are responsive to vibration in the shaft and serve to vent lubricant between opposing apertures in order to vary the stiffness and hence the spring rate of the bearing as the shaft approaches critical speed.

5 Claims, 3 Drawing Figures

BEARING SUPPORT SYSTEM WITH CONTROLLABLE SPRING RATE

BACKGROUND OF THE INVENTION

The field of the present invention is bearing support systems for high speed rotating machinery.

Conventional journal bearings that are lubricated with viscous lubricants and used to support a rotating shaft have the characteristic of allowing the shaft to displace itself under bearing load in proportion to the force of the load. Thus, the bearing has a so-called spring rate. The rotating assembly also has a mass, so the combination of this mass and the spring rate of the bearing comprises the elements of an oscillating system the characteristics of which may be derived mathematically. The system characteristic of concern here is a so-called critical speed of the shaft and bearing system. This critical speed is the rotational frequency at which the shaft will resonate in the bearing. Frequently, it is very difficult to get sufficiently rigid bearings to place this resonance frequency above the shaft running speed, and thus it often occurs within the operating range. The result can be severe vibration and possible bearing damage.

One solution to this problem is suggested by Sternlicht, U.S. Pat. No. 3,124,395. Sternlicht discloses a method and apparatus for bypassing critical speeds of rotors by varying either the lubricant film thickness, lubricant viscosity or the lubricant temperature in hydro-dynamic bearings at predetermined shaft speeds. Sternlicht's method, however, is somewhat complicated, would appear to suffer from rather slow response time, and being responsive only to predetermined speeds, would not be readily adaptable to varying shaft loading conditions that would alter the critical speeds. Thus, it is desirable to have a journal bearing support system with a controllable spring rate which is highly responsive to the onset of a critical speed condition and which is operable under variable loading conditions.

SUMMARY OF THE INVENTION

The present invention is directed to a control system for bypassing critical speeds in high speed rotating shafts supported by bearings.

Associated with such a bearing is a pair of fluid apertures and a connecting fluid vent line having a fluid control therein. The fluid control is to be responsive to shaft vibration in the vicinity of an associated bearing. Should the vibration in a given bearing approach a critical point, fluid may be appropriately vented around the bearing, altering the stiffness thereof. The system may be tuned to provide an advantageous phase shift in the flow of lubricant.

DETAILED DESCRIPTION OF THE PREFERRED EMBODIMENT

Figure 1:
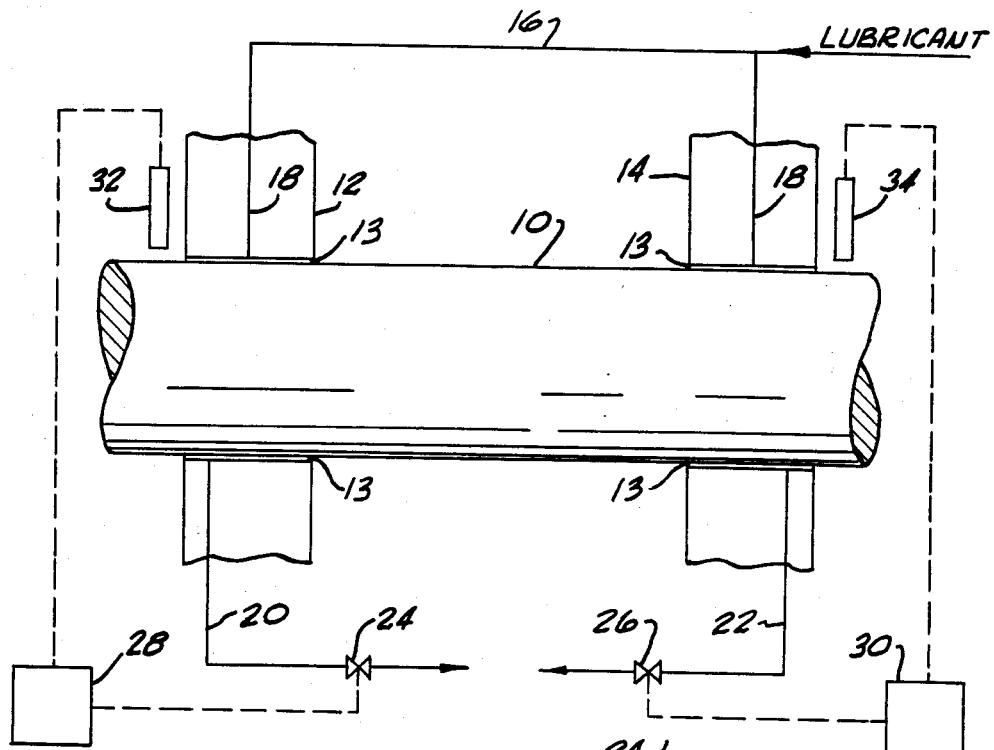
FIG. 1 is a side view of a shaft supported in accordance with the present invention.
Figure 3:
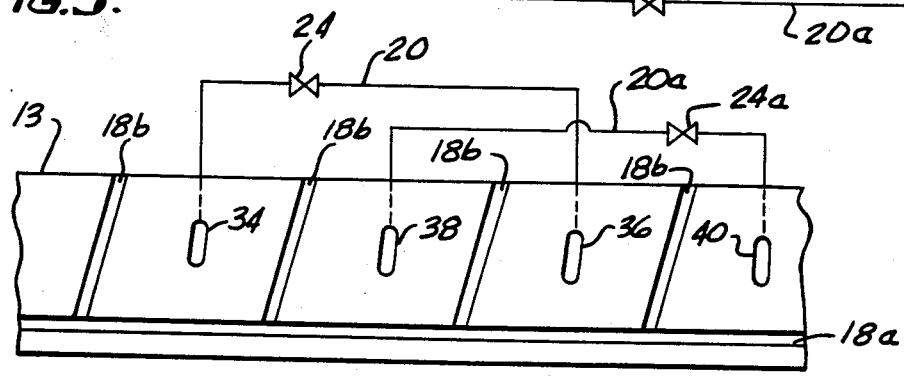
FIG. 3 is a developed view of the face of the bearing of FIG. 2.

Referring to FIG. 1, a high speed rotating shaft 10 is supported by hydro-dynamic journal bearings 12 and 14 having bearing seats 13. The bearings 12 and 14 are supplied with pressurized lubricant through a main lubricant feed line 16 and individual lubricant inlet lines 18. Fluid emerging from the lubricant inlet lines 18 circulates circumferencally around the bearing through channel 18a as shown in FIG. 3. The lubricant is then forced through roughly axially extending channels 18b to then be swept across the bearing surfaces. Principal lubricant flow is then axial along the shaft and discharged outwardly of the bearings.

The bearings 12 and 14 include fluid vent lines 20 and 22, respectively. Disposed in the vent lines 20 and 22 are control valves 24 and 26. The control valves 24 and 26 include, in turn, valve controllers 28 and 30. The controllers are responsive to a vibration control signal generated by vibration sensors 32 and 33 positioned adjacent the bearings. Should shaft vibration in the vicinity of either bearing approach a predetermined critical level, the respective control sensor 32 or 33 will generate a vibration signal causing the associated valve 24 or 26 to modulate fluid flow through fluid vent lines 20 or 22, as the case may be.

Fluid vent line 20 is shown providing fluid communication between the apertures 34 and 36 located in the bearing seat 13. A second fluid vent line 20a provides fluid communication between the apertures 38 and 40 also located in the bearing seat 13. Associated with the vent line 20a is a valve 24a which functions in the same manner as the valve 24. Additional vent lines and aperture pairs could also be employed to provide even greater control.

Figure 2:
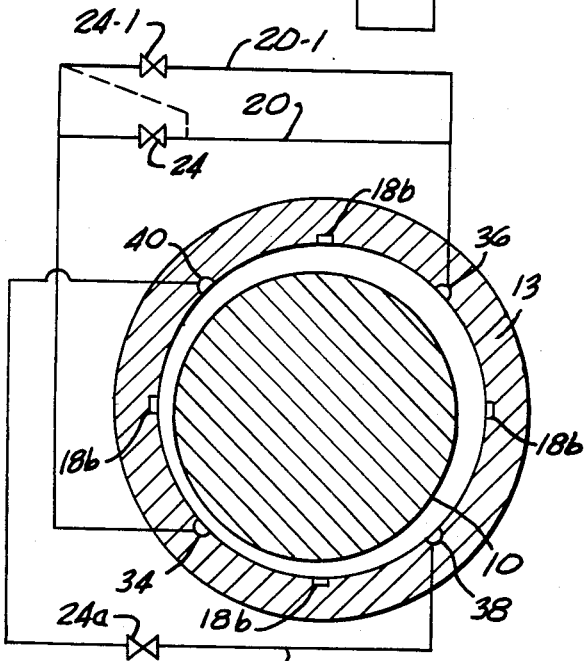
FIG. 2 is a cross-sectional view of a shaft and a bearing taken along line 2—2 in FIG. 1.

In FIG. 2, the shaft 10 is shown in an eccentric position such as would result from a radial load. The oil film is shown thin adjacent the aperture 34 and thick on the opposite side of the shaft 10 adjacent the aperture 36. If the valve 24 were open, it would allow lubricant to flow from its pressurized zone at the aperture 34 to the underpressurized zone adjacent the aperture 36, thus resulting in a lower bearing spring rate. About one-half a revolution from this position oil would flow backwards through valve 24 and have a similar effect if the radial loading rotates with the shaft 10. It is generally such loading due to imbalance or shaft geometry which must be addressed in overcoming phenomena associated with the natural frequency of a system.

This bleeding of oil and some throttling or friction not only reduces the spring rate but also absorbs power from the oscillating shaft system and thus has a damping effect. By incorporating two pairs of connected apertures, i.e. 34 and 36 and 38 and 40, still greater control and damping is possible. For convenience, valves 24 and 24a could be combined into a single mechanism if desired and be built into the bearing body or quite near it.

In addition, the vent lines 20 and/or 20a may be "tuned," that is, the length and the cross-sectional area along the length of the vent line may be so selected that the inertia of the oil moving first in one direction and then the other will cause the oil velocity to increase after its driving pressure differential passes its maximum and begins to decrease. This may be achieved by empirical testing. This flow will continue to some extent after the driving force becomes negative; that is, the phase of the oscillating oil flow will be shifted. Further, if the tuning of the lines 20 and 20a is required to be varied, this can be accomplished by one or more bypass lines such as 20-1, each having its own control valve such as 24-1. The phase shift of this oil-flow out of phase with the shaft oscillation provides the further benefit of increasing the protection from possible metal-to-metal contact by delaying the maximum oil withdrawal from the oil film until after the instant of minimum clearance.

The present system is especially useful when the journal bearing has Rayleigh type oil grooving. Such grooving includes a dam just ahead of the axial oil grooves. The apertures 34–40 may be located ahead of the dams in zones of larger clearance where more oil is or can be pumped by the shaft rotation. Thus the lateral shaft displacement has less effect on this zone than in a closer clearance zone of a simple journal bearing, and the tuned vents and vent line can be more effective.

Thus, a control system for bypassing critical speeds in a high speed rotating turbine shaft supported by multiple journal bearings is disclosed wherein lubricant stiffness in each bearing may be adjusted by venting lubricant between opposing sides of the shaft in response to a vibration control signal indicating a predetermined vibration level in the vicinity of the bearing.

While embodiments and applications of this invention have been shown and described, it would be apparent to those of ordinary skill in the art that many more modifications would be possible without departing from the inventive concept herein. Thus, the invention is not to be limited except in the spirit of the appended claims.

What is claimed is:

1. A bearing support for a high speed rotating shaft, comprising
   a journal bearing having a cylindrical bearing seat for supporting a shaft therein;
   at least a pair of opposed fluid apertures defined in the inner face of said bearing seat;
   fluid vent lines extending between each said pair of fluid apertures;
   a vibration sensor positioned adjacent said bearing for generating a control signal responsive to shaft vibration;
   a valve disposed in each said fluid vent line to control fluid communication between said apertures; and
   at least a valve controller responsive to said control signal for controlling at least one said valve in response to shaft vibration.

2. The bearing support of claim 1 comprising two pairs of opposed fluid apertures defined in the inner face of said bearing seat, said fluid apertures being symmetrically disposed about said inner face of said bearing seat.

3. The bearing support of claim 1 wherein said fluid vent lines are tuned such that flow lags pressure in said lines.

4. The bearing support of claim 1 wherein said fluid vent lines further include parallel shunt lines therein.

5. A bearing support for a high speed rotating shaft, comprising
   two journal bearings axially aligned and axially displaced, each said journal bearing having a cylindrical bearing seat for supporting the shaft therein;
   at least a pair of opposed fluid apertures defined in the inner face of each said bearing seat;
   fluid vent lines extending between each said pair of fluid apertures;
   a vibration sensor positioned adjacent each said bearing for generating a control signal responsive to shaft vibrations;
   a valve disposed in each said fluid vent line to control fluid communication between said apertures; and
   at least a valve controller responsive to said control signal for controlling at least one said valve in response to shaft vibration.

* * * * *